UNITED STATES PATENT OFFICE.

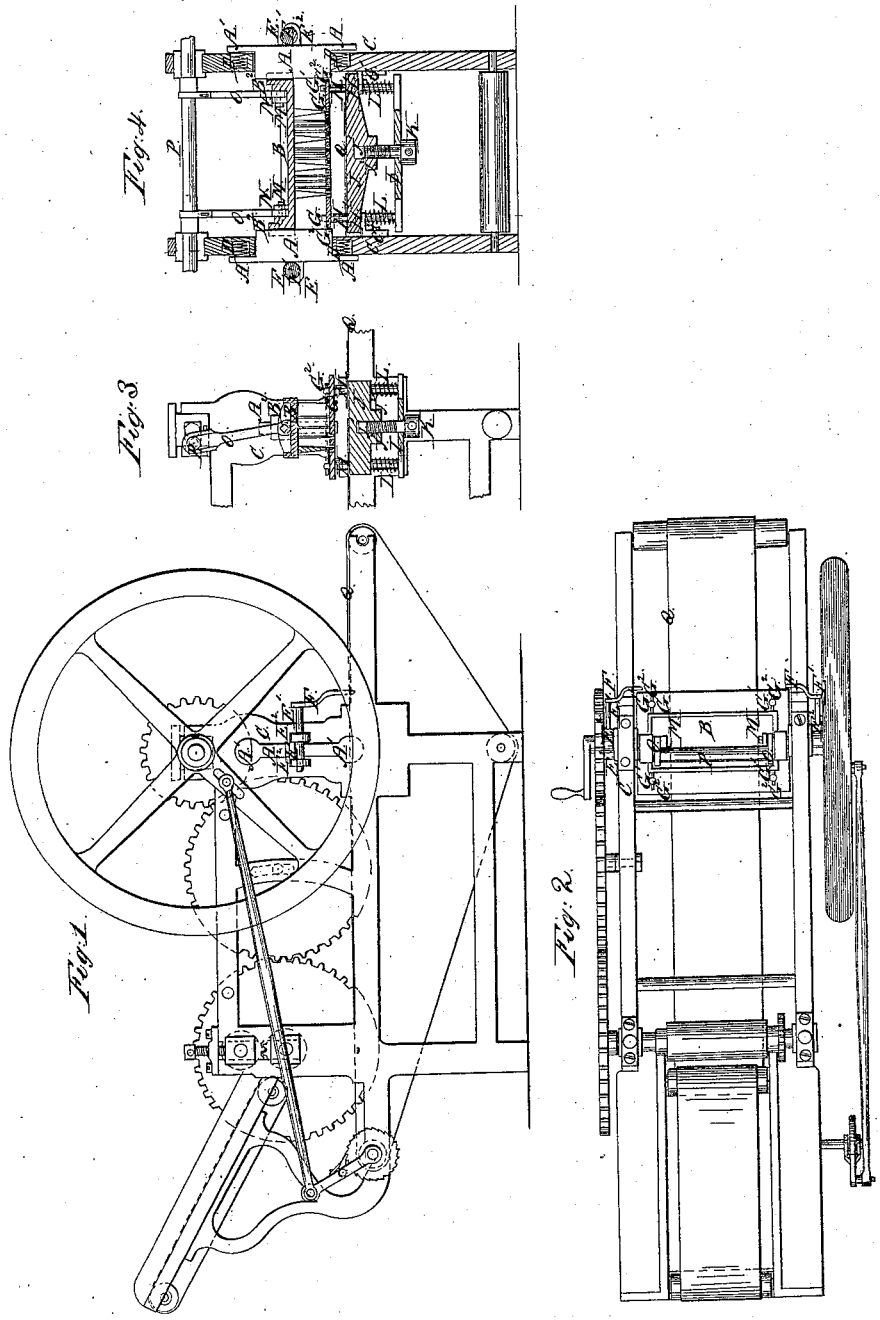

I. S. SCHUYLER, OF NEW YORK, N. Y., ASSIGNOR TO J. McCOLLUM, OF SAME PLACE.

MACHINE FOR ROLLING AND CUTTING DOUGH.

Specification of Letters Patent No. 19,968, dated April 13, 1858.

*To all whom it may concern:*

Be it known that I, ISAAC S. SCHUYLER, of the city and county of New York, State of New York, have invented certain new and useful improvements in machinery used for rolling and cutting bread-dough into suitable forms for loaves of bread, crackers, and similar articles; and I do hereby declare that the following is a full, clear, and exact description of the construction and operation of the same.

The nature of my invention consists, first, in the substitution of removable, or shifting guides, in place of the permanent stationary guides, heretofore used in combination with the slides of reciprocating cutters; second, in the combination of mechanical devices by which the above mentioned shifting guides are operated, for the purpose of releasing the cutter, so that it may be removed with facility, and replaced by another, without the labor and difficulty of lifting the cutters, which, in full sized machines are often very heavy, up over the guides as formerly done, and now the usual practice; third, in the substitution of an adjustable perforated clearer plate, in place of the well known stationary perforated clearer plates, in combination with reciprocating cutters, for the purpose of discharging the dough therefrom at the point most favorable to the operation, which varies according to the thickness of the dough; fourth, in giving the said adjustable clearer plate a yielding pressure on the dough, when acting to discharge, that is, when, by the upward motion of the cutter, the dough is drawn up against the under side of the clearer plate; fifth in the combination of mechanical devices, by which the clearer plate is supported, and adjusted, and by which the yielding pressure is effected.

But to describe my improvements more particularly, and fully, I will refer to the accompanying drawings making a part of this specification, which represent a well known form of cracker or bread cutting machine, consisting of a feed table surrounded by an endless feeding band, a pair of reducing rolls having continuous motion, a reciprocating cutter passing through a perforated clearer plate, and impinging on an endless carrying apron, having a progressive intermittent motion, and supported at the cutting point, by a bed plate firmly attached to the side frames, together with my improvements, and in which drawings—

Figure 1 is a side elevation of machine. Fig. 2 is a plan view. Fig. 3 is a vertical longitudinal cut section of the cutting part of the machine. Fig. 4 is a vertical cross section of Fig. 3.

As I do not intend to confine the application of my improvements to the precise form of machine in all respects as shown in the drawings, and as it is a machine generally and well known to bakers, I shall not describe it in detail, but proceed to describe my improvements, only including the parts of the machine immediately connected therewith.

Letters A, A represent vertical guides fitted to the slides $B^2$ $B^2$ of the reciprocating cutters B, and perform the functions so far as guiding and directing the motion of the cutter is concerned, of the ordinary permanent guides. They extend laterally through the side frames C, C, being accurately fitted to guide slots cut therein, which permit of the projection, and withdrawal, in a lateral direction of the guides, but confine them so as to prevent other motion.

D, D, D, D, are recesses, in which are concealed spiral springs which act against ears, A', A', A', A' on the guides for the purpose of withdrawing them from the slides of the reciprocating cutter.

E, E, are eccentrics or cams forged on shafts E' E' which turn in journals in lugs $E^2$, $E^2$, $E^2$, $E^2$, and are provided with handles F, F, for the convenience of the operator. The eccentrics E, E, act against the back of the guides A A to project them into the slides of the cutter, against the withdrawing action of the springs, and they should be so placed, and proportioned, that when the ears of the guide are pressed firmly in contact with the side frame, the point of contact of the eccentric with the guides, the center of the eccentric, and the axis of the eccentric shaft will be in line with each other, so as form a lock to hold the guides firmly in place, while the cutter is to remain in the machine.

G is a discharger plate, perforated in the usual manner, to permit the passage through it of the knives, and docker teeth, of the cutter B. It has also circular holes in each corner, by means of which it is slipped on to stud, G', G', G', G', turned on the ends of the four vertical sliding columns H, H, H, H, and is secured thereto by the key rods G², G². These columns pass through corresponding holes in the corners of the bed plate J (which act as guides and of which only two are shown in the drawing at H', H',) and are firmly fastened at the bottom in the frame plate I at the corners thereof.

J is a bed plate firmly attached to the side frames C, C, by angle brackets C', C'. In the middle of the underside of this bed plate is a vertical socket J' running through boss J² up into the bed plate, in which socket is cut an internal screw matching the vertical external set screw K which passes down through a circular hole in the middle of the frame plate I and acts vertically against the underside thereof.

L, L, L, L, are spiral springs surrounding the columns H, H, H, H, and extend from the under side of the bed plate J, to the upper side of the frame plate I. These springs act to press down the frame plate equally at the corners, thereby causing it, together with the columns and clearer plate, to follow the shoulder of the set screw K, and also make yielding resistance to the pressure of the dough against the clearer plate, when acting to discharge the same from the cutters.

M, M, are slip bolts in lugs N, N, they pass through eyes in the lower ends of the connecting rods O, O, and are slipped out to disconnect the cutter from the crank shaft P.

The red line Q is an endless carrying apron, having an intermittent progressive motion and passing between the clearer plate and bed plate, but as the office of this is well known in cracker machinery I will not take up time by further description of it.

The operation of the various parts above described, is as follows, viz: When it is desired to change a cutter and clearer, of which sometimes as many as fifteen or more different ones are fitted to one machine, the cutter is disconnected from the crank shaft, by withdrawing the slip bolts M M, the handles F, F, are raised, which throw out the eccentrics, and allow the springs to act, to withdraw the guides from the slides of the cutter, the key rods are pulled out, releasing the clearer plate G from the columns, from which it is lifted clear, and then both the clearer and cutter may be drawn forward out of the machine, and replaced by another, the guides projected into the slides of the same the slip bolts M M, and key rods G, G, replaced, and the machine is ready again for operation.

The practical baker will readily see the great advantage of my improvements, he having experience of the annoyance, and difficulty, of endeavoring to fit a heavy cutter on to the permanent guides, in a hot bake house, with the oven waiting for the bread, or crackers, to be cut. He will also understand the advantage of being able by turning the set screw K, to set the clearer instantly, at the most favorable point for clearing and delivering the work cut smoothly on to the carrying apron, as well as the advantage in the wear of the perforated clearer plate, obtained by easing the blow by a yielding resistance, when the dough is brought forcibly against the lower side of the same, by the upward movement of the cutter. It is however evident that if the springs are made very stiff the clearer will not practically make yielding resistance when acting to discharge, and also that if a binding nut, collar, or pin, be attached to the set screw K immediately above the frame plate I, so as to confine the frame plate between the shoulder so formed, and the head of the set screw, there will be no yielding action of the perforated discharge plate, though its adjustability will not be interfered with.

What I claim as my invention, and desire to secure by Letters Patent of the United States, is—

1. I claim the removable guides A, A, or their equivalent when used in combination with the slides of a reciprocating cutter and operated for the purpose of releasing and securing the cutter substantially as hereinbefore described.

2. I claim the perforated discharging plate, either with or without yielding resistance, in combination with the reciprocating cutter when made adjustable substantially as hereinbefore described.

ISAAC S. SCHUYLER.

Witnesses:
L. A. ROCKWELL,
GEO. L. OSBORN.